US009219906B2

United States Patent
Yanagita et al.

(10) Patent No.: US 9,219,906 B2
(45) Date of Patent: Dec. 22, 2015

(54) IMAGE DISPLAY DEVICE AND METHOD AS WELL AS PROGRAM

(75) Inventors: Satoshi Yanagita, Miyagi (JP); Daisuke Shikata, Miyagi (JP)

(73) Assignee: FUJIFILM Corporation, Tokyo (JP)

( * ) Notice: Subject to any disclaimer, the term of this patent is extended or adjusted under 35 U.S.C. 154(b) by 329 days.

(21) Appl. No.: 13/262,471

(22) PCT Filed: Mar. 30, 2010

(86) PCT No.: PCT/JP2010/002297
§ 371 (c)(1),
(2), (4) Date: Oct. 7, 2011

(87) PCT Pub. No.: WO2010/113473
PCT Pub. Date: Oct. 7, 2010

(65) Prior Publication Data
US 2012/0019532 A1      Jan. 26, 2012

(30) Foreign Application Priority Data

Mar. 31, 2009    (JP) .................................. 2009-084719

(51) Int. Cl.
*G06T 15/00* (2011.01)
*H04N 13/00* (2006.01)
(Continued)

(52) U.S. Cl.
CPC ....... *H04N 13/0055* (2013.01); *H04N 13/0018* (2013.01); *G09G 3/003* (2013.01);
(Continued)

(58) Field of Classification Search
CPC  G09G 3/003; G09G 2320/08; H04N 13/0018
USPC .......................................................... 348/51
See application file for complete search history.

(56) References Cited

U.S. PATENT DOCUMENTS

| 5,640,171 A | 6/1997 | Shimada |
| 6,549,650 B1 | 4/2003 | Ishikawa et al. |

(Continued)

FOREIGN PATENT DOCUMENTS

| EP | 1 901 236 A1 | 3/2008 |
| JP | 8-79800 A | 3/1996 |

(Continued)

OTHER PUBLICATIONS

Extended European Search Report for European Application No. 10758253.8, dated Jan. 2, 2013.

(Continued)

*Primary Examiner* — Tat Chio
*Assistant Examiner* — Nguyen Truong
(74) *Attorney, Agent, or Firm* — Birch, Stewart, Kolasch & Birch, LLP

(57) ABSTRACT

Three-dimensional processing is applied to more than one images taken from different points of view to generate a stereoscopic image, and the stereoscopic image is stereoscopically displayed. An instruction to control a stereoscopic effect of the stereoscopically displayed stereoscopic image is received, and the three-dimensional processing is applied to the more than one images to achieve a stereoscopic effect according to the instruction. Then, control values of the stereoscopic effect according to the instruction are recorded in a recording unit with the control values being associated with the more than one images. At this time, if there are the control values of the stereoscopic effect recorded in the recording unit, difference values between the control values of the stereoscopic effect according to the instruction and the recorded control values of the stereoscopic effect are recorded in the recording unit.

18 Claims, 10 Drawing Sheets

(51) Int. Cl.
　　　*G09G 3/00*　　　(2006.01)
　　　*G09G 3/34*　　　(2006.01)

(52) U.S. Cl.
　　　CPC ......... *G09G 3/342* (2013.01); *G09G 2310/021* (2013.01); *G09G 2310/024* (2013.01); *G09G 2320/0209* (2013.01); *G09G 2320/08* (2013.01)

(56) References Cited

U.S. PATENT DOCUMENTS

| | | | |
|---|---|---|---|
| 7,102,686 B1 * | 9/2006 | Orimoto et al. | 348/375 |
| 7,349,006 B2 * | 3/2008 | Sato et al. | 348/51 |
| 7,636,088 B2 * | 12/2009 | Nomura et al. | 345/419 |
| 7,679,616 B2 | 3/2010 | Nomura et al. | |
| 2002/0071616 A1 | 6/2002 | Yoshida | |
| 2005/0248561 A1 | 11/2005 | Ito et al. | |
| 2006/0087556 A1 * | 4/2006 | Era | 348/51 |
| 2009/0109281 A1 * | 4/2009 | Mashitani et al. | 348/43 |

FOREIGN PATENT DOCUMENTS

| | | | | |
|---|---|---|---|---|
| JP | 9-192349 A | | 7/1997 | |
| JP | 10-90814 A | | 4/1998 | |
| JP | 2004-129186 A | | 4/2004 | |
| JP | 2004-221699 A | | 8/2004 | |
| JP | 2004221699 A | * | 8/2004 | ............ H04N 13/02 |
| JP | 2005-181377 A | | 7/2005 | |
| JP | 2008-172342 A | | 7/2008 | |
| WO | WO 03/092303 A1 | | 11/2003 | |

OTHER PUBLICATIONS

Office Action for Japanese Application No. 2009-084719, dated Dec. 25, 2012, including partial English translation.

International Search Report for International Application No. PCT/JP2010/002297, dated Jun. 29, 2010.

Chinese Office Action issued in Chinese Patent Application No. 201080015057.9 on Apr. 25, 2014.

Chinese Office Action issued in Chinese Patent Application No. 201080015057.9 on Feb. 11, 2014.

Chinese Search Report issued in Chinese Application No. 201080015057.9 on Feb. 11, 2014.

The European Office Action, issued Jul. 23, 2015, for European Application No. 10758253.8 is provided.

* cited by examiner

Fig. 17
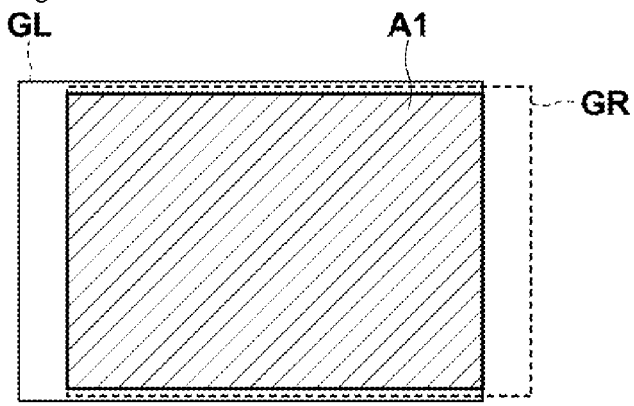
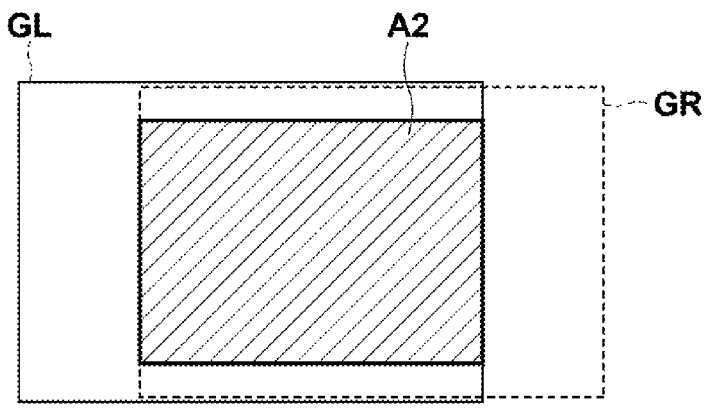
Fig. 18
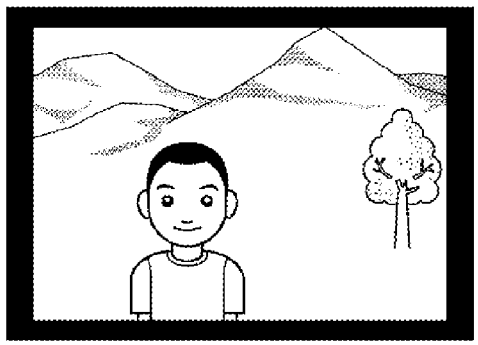
SMALL PARALLAX LEVEL
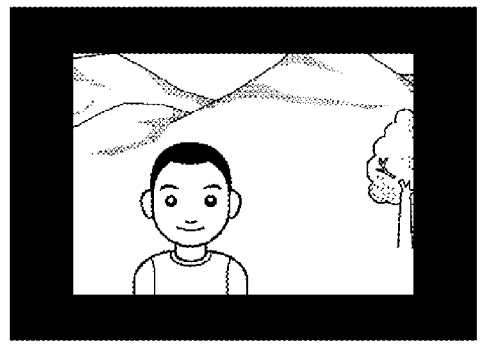
LARGE PARALLAX LEVEL
Fig. 19
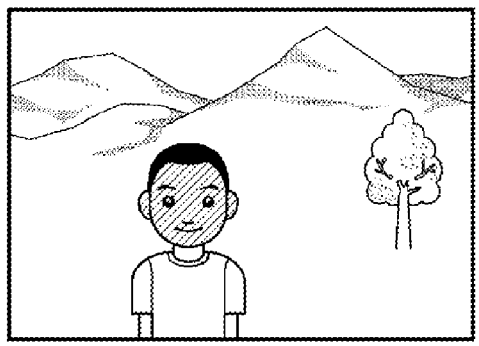

IMAGE DISPLAY DEVICE AND METHOD AS WELL AS PROGRAM

TECHNICAL FIELD

The present invention relates to image display device and method for stereoscopically displaying a stereoscopic image generated from more than one images to allow stereoscopic viewing of the image, as well as a program for causing a computer to carry out the image display method.

BACKGROUND ART

It has been known to provide stereoscopic viewing with using parallax by generating a stereoscopic image by combining more than one images of the same subject taken from different positions, and stereoscopically displaying the stereoscopic image. As a specific example of the stereoscopic display, parallel viewing with naked eyes is known, where the stereoscopic display is achieved by arranging the more than one images side by side. Further, the stereoscopic display may be achieved by generating a stereoscopic image by combining the more than one images, for example, by overlapping the images with changing the colors of the images into, for example, red and blue, or by overlapping the images with providing different polarization directions of the images. In these cases, the stereoscopic viewing is effected by using image separating glasses, such as red-and-blue glasses or polarization glasses, to provide a merged view of the stereoscopically displayed stereoscopic image (anaglyph system, polarization filter system).

Furthermore, the stereoscopic viewing may be achieved by displaying the more than one images on a stereoscopic display monitor which allows the stereoscopic viewing of the images, such as in a parallax barrier system or a lenticular system, without using the polarization glasses, etc. In this case, the stereoscopic display is achieved by cutting the more than one images into vertical strips and alternately arranging the strips to generate a stereoscopic image. Moreover, a method for providing the stereoscopic display using afterimage effect has been proposed, in which left and right images are alternately displayed by being switched at a high speed with changing the direction of light beams from the left and right images through the use of the image separation glasses or attaching an optical element on a liquid crystal display (scanning backlight system).

When the stereoscopic viewing is provided in such manners, a preferred level of stereoscopic effect varies among users who view the stereoscopic images. In order to address this problem, a technique to generate a stereoscopic image has been proposed, where an instruction to control a parallax level of the stereoscopic image is received while the image is stereoscopically displayed, and the stereoscopic image is generated according to the instructed parallax level (see Japanese Unexamined Patent Publication No. 2004-129186, which is hereinafter referred to as Patent Document 1). Another technique to generate a stereoscopic image has been proposed, where the stereoscopic effect is controlled while the stereoscopic image being displayed is stereoscopically viewed (see Japanese Unexamined Patent Publication No. 10 (1998)-090814, which is hereinafter referred to as Patent Document 2). A technique to control the stereoscopic effect during a video game has also been proposed (see Japanese Unexamined Patent Publication No. 9(1997)-192349, which is hereinafter referred to as Patent Document 3).

In the techniques disclosed in Patent Documents 1 to 3, however, the stereoscopic image generated from more than one images is stored. therefore, after the stereoscopic image has been generated, only the stereoscopic image with the stereoscopic effect that was fixed when the image was generated can be displayed, and the stereoscopic effect of the image cannot be changed even when the user wishes to change the stereoscopic effect.

DISCLOSURE OF INVENTION

In view of the above-described circumstances, the present invention is directed to allow changing the stereoscopic effect of stereoscopic images.

An image display device according to the invention includes: display means capable of stereoscopically displaying a stereoscopic image generated from more than one images taken from different points of view; input means for receiving an instruction to control a stereoscopic effect of the stereoscopic image while the stereoscopic image is stereoscopically displayed by the display means; three-dimensional processing means for applying three-dimensional processing for stereoscopic display to the more than one images to generate the stereoscopic image, the three-dimensional processing being applied to achieve a stereoscopic effect according to the instruction; and recording control means for recording, in a recording medium, control values of the stereoscopic effect according to the instruction, the control values being associated with the more than one images.

The control values of the stereoscopic effect may be a parallax level between the more than one images, or any of various control values that influences the stereoscopic effect of the image being stereoscopically displayed besides the parallax level. For example, the control values of the stereoscopic effect may be amounts of change to correct for inclination, scaling factor and distortion of the images, or may be amounts of correction to correct for white balance variation, brightness variation and color variation between the images.

In the image display device according to the invention, the input means may include means for receiving an instruction to switch between stereoscopic display of the stereoscopic image and two-dimensional display of the more than one images being overlapped each other, and the image display device may further include display control means for switching between the stereoscopic display and the two-dimensional display according to the instruction to switch.

In the image display device according to the invention, the input means may include means for receiving an instruction to stereoscopically display the more than one images recorded in the recording medium, the recording control means may be means to read out, from the recording medium, control values of the stereoscopic effect together with the more than one images when the instruction to stereoscopically display the more than one images recorded in the recording medium is made and when the more than one images have the control values of the stereoscopic effect associated therewith, and the three-dimensional processing means may be means for applying the three-dimensional processing to the more than one images based on the control values of the stereoscopic effect.

The image display method according to the invention includes: applying three-dimensional processing to more than one images taken from different points of view to generate a stereoscopic image; stereoscopically displaying the stereoscopic image; receiving an instruction to control a stereoscopic effect of the stereoscopically displayed stereoscopic image; applying the three-dimensional processing to the more than one images to achieve a stereoscopic effect according to the instruction; and recording, in a recording medium, control values of the stereoscopic effect according to the instruction, the control values being associate with the more than one images.

The invention may be provided in the form of a program for causing a computer to carry out the image display method of the invention.

Effect of Invention

According to the invention, as the user make an instruction to control the stereoscopic effect while viewing the stereoscopic image being stereoscopically displayed, the three-dimensional processing is applied to the more than one images to achieve the instructed stereoscopic effect, and the thus generated stereoscopic image is stereoscopically displayed. When the instruction to control the stereoscopic effect is stopped, the control values of the stereoscopic effect at that time are stored with being associated with the more than one images. As described, in this embodiment, the original images before the three-dimensional processing is applied thereto are stored with being associated with the control values of the stereoscopic effect. Thus, when it is desired to change the stereoscopic effect, the three-dimensional processing is applied again to the original images to change the stereoscopic effect.

Further, by switching between the stereoscopic display and the two-dimensional display of the more than one images being overlapped each other, the user can easily check the parallax level of the more than one images with viewing the two-dimensional display thereof.

In addition, according to the invention, the control values of the stereoscopic effect are stored with being associated with the more than one images. By applying the three-dimensional processing using the control values of the stereoscopic effect associated with the more than one images when the more than one images are to be stereoscopically displayed, the more than one images can be stereoscopically displayed to achieve the stereoscopic effect according to the preference of the user who have controlled stereoscopic effect. This eliminates need of control of the stereoscopic effect by the user each time the stereoscopic display of the images is carried out, thereby reducing the burden on the user.

BRIEF DESCRIPTION OF DRAWINGS

FIG. 17 is a diagram for explaining how a trimming area is changed depending on a parallax level, FIG. 18 is a diagram illustrating a state where a black frame is added around a stereoscopic image, and FIG. 19 is a diagram illustrating a state where a color at an area with the parallax level of 0 is changed.

BEST MODE FOR CARRYING OUT THE INVENTION

Figure 1:
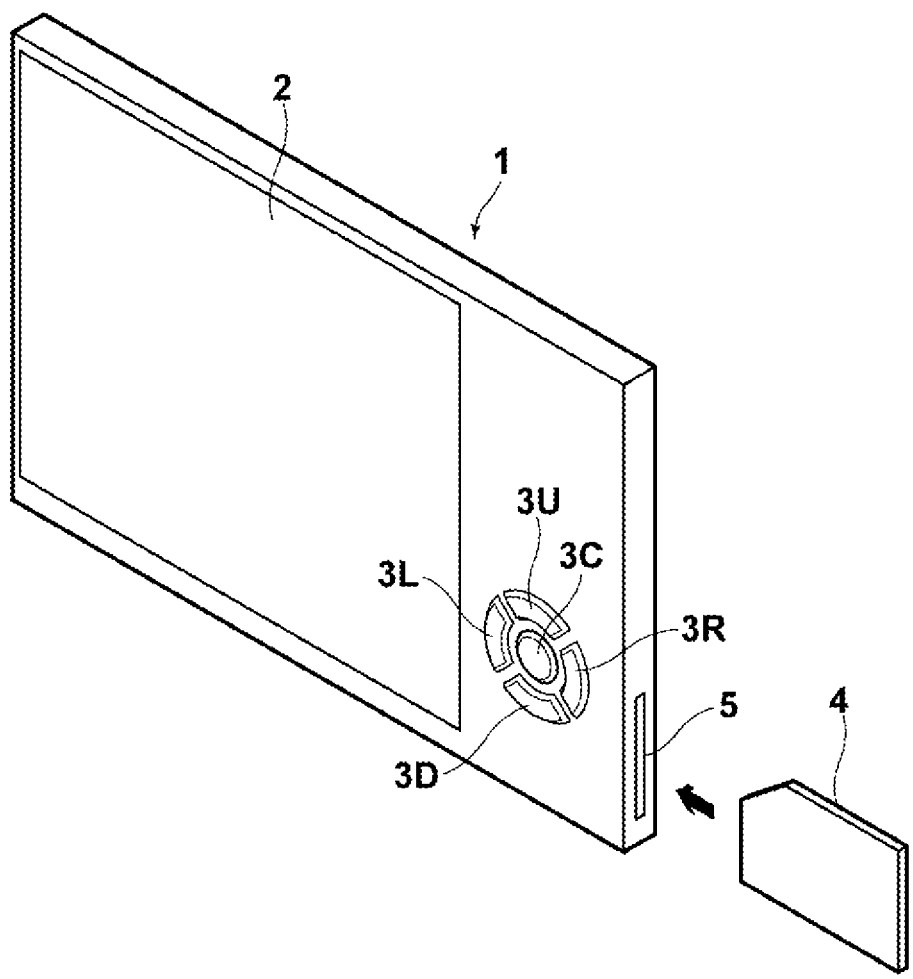
FIG. 1 is a perspective view illustrating the appearance of an image display device according to a first embodiment of the invention.

Hereinafter, embodiments of the present invention will be described with reference to the drawings. FIG. 1 is a perspective view illustrating the appearance of an image display device according to a first embodiment of the invention. As shown in FIG. 1, the image display device 1 according to the first embodiment includes a liquid crystal display (LCD) 2 and a manual operation button 3 at the front side thereof. The image display device 1 further includes, on a lateral side thereof, a slot 5 for receiving a recording medium 4, such as a memory card, inserted therein. The image display device 1 according to the first embodiment stereoscopically displays, on the LCD 2, a stereoscopic image which is generated from more than one images which are obtained by photographing the same subject from different positions and recorded in the recording medium 4. In the description of this embodiment, it is assumed that the stereoscopic display is carried out using two images GL, GR. The image GL is the image for the left eye and the image GR is the image for the right eye during the stereoscopic display.

The manual operation button 3 includes an upper button 3U, a lower button 3D, a left button 3L, a right button 3R and a center button 3C.

Figure 2:
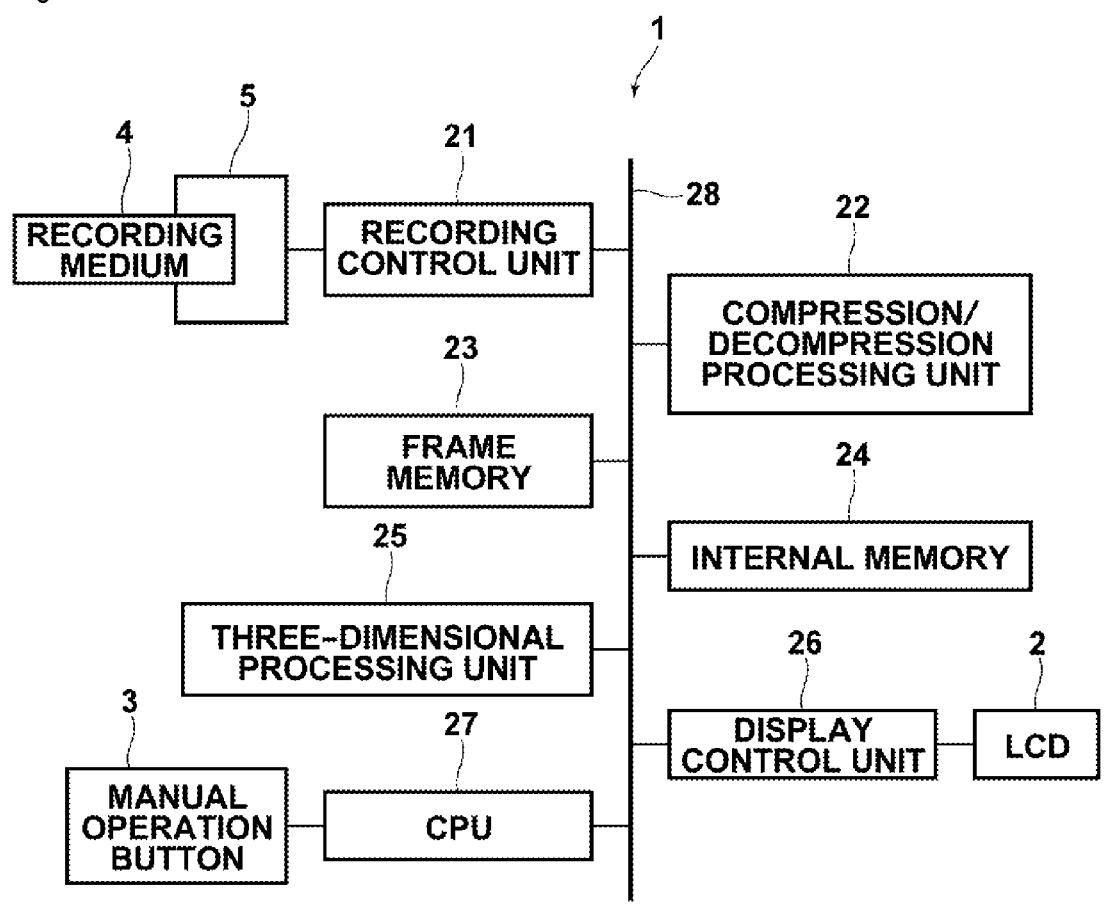
FIG. 2 is a schematic block diagram illustrating the internal configuration of the image display device according to the first embodiment.

FIG. 2 is a schematic block diagram illustrating the internal configuration of the image display device according to the first embodiment. As shown in FIG. 2, the image display device 1 includes a recording control unit 21, a compression/decompression processing unit 22, a frame memory 23, an internal memory 24, a three-dimensional processing unit 25, a display control unit 26 and a CPU 27.

The recording control unit 21 controls recording and reading of information into and from the recording medium 4 inserted in the slot 5. Further, the recording control unit 21 writes stereoscopic effect control values according to an instruction by the user in tags of image files of the images GL, GR, as will be described later.

The compression/decompression processing unit 22 carries out compression and decompression of the two images GL, GR to be stereoscopically displayed, which are read out from the recording medium 4. A tag storing the stereoscopic effect control values, which will be described later, and associated information, such as photographing time and date, is added to the image files of images GL, GR, based, for example, on the Exif format.

The frame memory 23 is a work memory for various processing including three-dimensional processing, which will be described alter, applied to the image data representing the images GL, GR.

The internal memory 24 stores various constants to be set within the image display device 1, programs to be executed by the CPU 27, etc.

The three-dimensional processing unit 25 applies the three-dimensional processing to the images GL, GR to generate a stereoscopic image for stereoscopically displaying the images GL, GR on the LCD 2. The technique used in this embodiment to achieve the stereoscopic display may be any of known techniques. For example, the images GL, GR may be displayed side by side to achieve the stereoscopic viewing through parallel viewing with naked eyes, or a lenticular system may be used, in which a lenticular lens is attached on the LCD 2, and the images GL, GR are displayed at predetermined positions on the display surface of the LCD 2 so that the images GL, GR are respectively viewed by the left and right eyes to achieve the stereoscopic display. Further, a parallax barrier system may be used, in which a barrier for changing optical paths to the left and right eyes is attached on the LCD 2, and the images GL, GR are displayed at predetermined positions on the display surface of the LCD 2 so that the images GL, GR are respectively viewed by the left and right eyes to achieve the stereoscopic display.

Furthermore, the stereoscopic display may be achieved by combining the images GL, GR by overlapping the images GL, GR with changing the colors of the images GL, GR into, for example, red and blue, or by overlapping the images GL, GR with providing different polarization directions of the images GL, GR (anaglyph system, polarization filter system). Moreover, a scanning backlight system may be used, which achieves the stereoscopic display by optically separating the optical paths of the backlights of the LCD 2 correspondingly to the left and right eyes in an alternate manner, and alternately displaying the images GL, GR on the display surface of the LCD 2 according to the separation of the backlights to the left and right.

The LCD 2 is modified according to the type of the three-dimensional processing carried out by the three-dimensional processing unit 25. For example, when the stereoscopic display is implemented with the lenticular system, a lenticular lens is attached on the display surface of the LCD 2. In the case of the parallax barrier system, a barrier is attached on the surface of the LCD 2. In the case of the scanning backlight system, an optical element for changing directions of the light beams from the left and right images is attached on the display surface of the LCD 2.

The three-dimensional processing unit 25 applies image processing, such as white balance correction, tone correction, sharpness correction and color correction, to the images GL, GR. It should be noted that a separate image processing unit for applying the image processing may be provided besides the three-dimensional processing unit 25.

The three-dimensional processing unit 25 changes the parallax level of the images GL, GR to regenerate a stereoscopic image G3 according to the stereoscopic effect controlled by the user using the manual operation button 3 while the stereoscopic image G3 is stereoscopically displayed, and stereoscopically displays the regenerated stereoscopic image G3.

The display control unit 26 stereoscopically displays the stereoscopic image G3 obtained through the three-dimensional processing or two-dimensionally displays the images GL, GR.

The CPU 27 controls the units of the image display device 1 according to instructions fed via the manual operation button 3.

The data bus 28 is connected to the various units forming the image display device 1 and the CPU 27 for communication of various data and information in the image display device 1.

Figure 3:
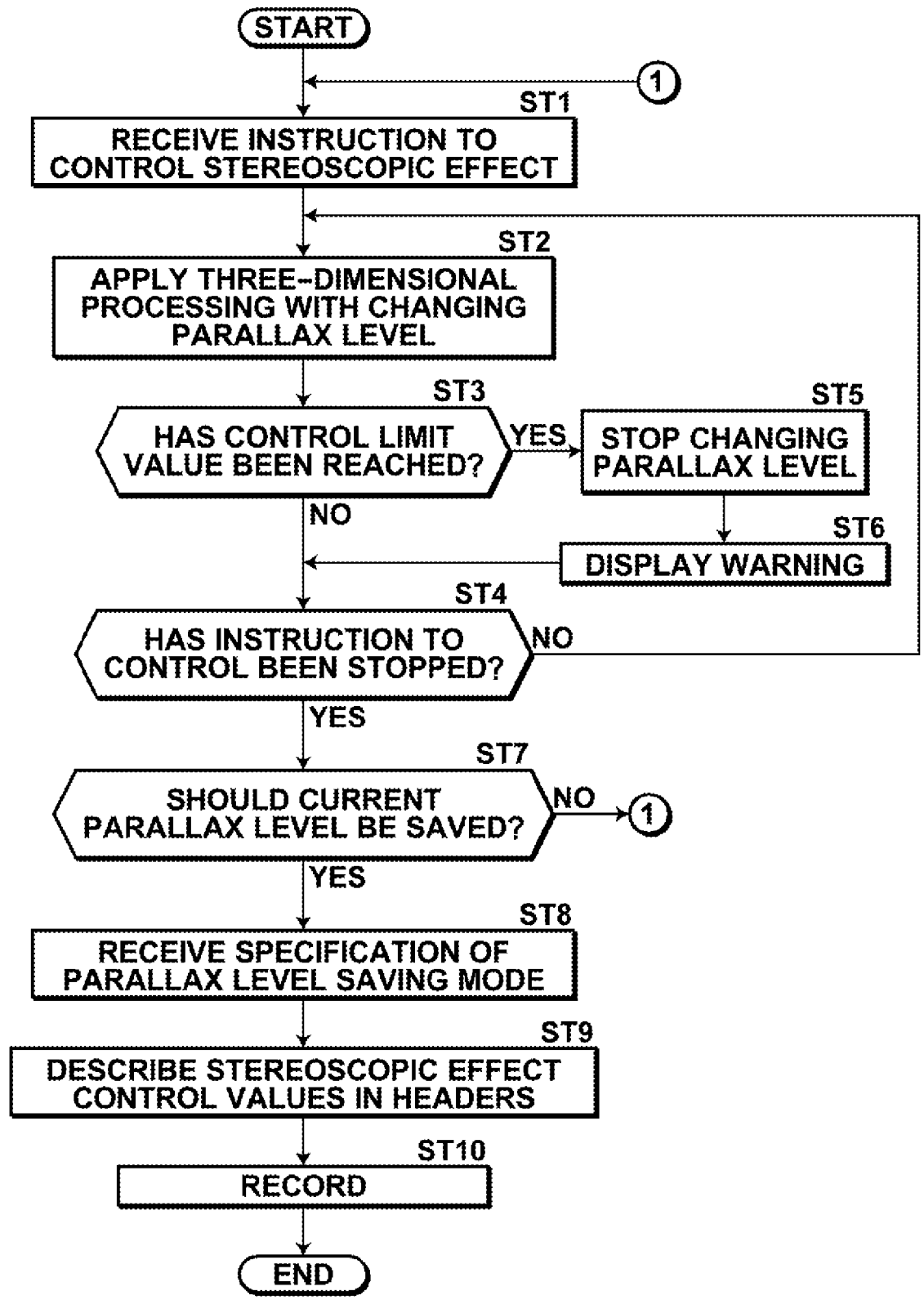
FIG. 3 is a flow chart illustrating a process that is carried out during stereoscopic effect control in the first embodiment.

Next, a process carried out in the first embodiment is described. FIG. 3 is a flow chart illustrating a process that is carried out during stereoscopic effect control in the first embodiment. In this description, it is assumed that the three-dimensional processing has been applied to the images GL, GR read out from recording medium 4 without changing the parallax level, and the thus generated stereoscopic image G3 is stereoscopically displayed on the LCD 2. The CPU 27 starts the process when the stereoscopic image G3 is stereoscopically displayed, and receives an instruction to control the stereoscopic effect made by the user via the manual operation button 3 (step ST1). With this, the three-dimensional processing unit 25 applies the three-dimensional processing to the images GL, GR with changing the parallax level to achieve the instructed stereoscopic effect (step ST2).

Figure 4:
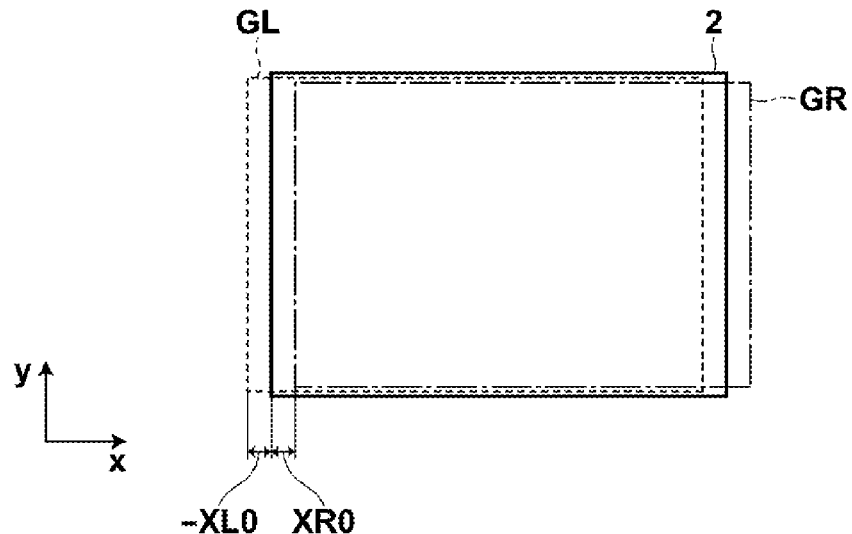
FIG. 4 is a diagram for explaining how a parallax level is changed.

FIG. 4 is a diagram for explaining how the parallax level is changed. In FIG. 4, the solid line indicates a display range of the LCD 2, the dashed line indicates the image GL, and the dashed-dotted line indicates the image GR. Although the images GL, GR and the LCD 2 actually have the same size in the longitudinal direction, they are shown with different sizes in the longitudinal direction for the convenience of explanation. Since the images GL, GR are obtained by photographing the same subject from different positions, there is a predetermined level of parallax between the images of the subject contained in the images GL, GR, as can be seen when the images GL, GR are overlapped each other. Therefore, by applying the three-dimensional processing to the images GL, GR to generate a stereoscopic image and stereoscopically displaying the stereoscopic image, stereoscopic viewing can be provided.

However, since a preferred level of the stereoscopic effect varies among different users, the instruction to control the stereoscopic effect made by the user via the manual operation button 3 is received in this embodiment, and the parallax level of the images GL, GR is changed to achieve the instructed stereoscopic effect. For example, in this embodiment, the parallax level is changed such that a smaller stereoscopic effect, i.e., a smaller parallax level, is provided when the left button 3L of the manual operation button 3 is pressed, and a larger stereoscopic effect, i.e., a larger parallax level, is provided when the right button 3R is pressed.

The amount of change of the parallax level of the images GL, GR, with the left end of the LCD 2 being the reference position in the horizontal direction, is indicated by the amount of shift corresponding to the number of pixels in the horizontal direction from the reference position. For example, as shown in FIG. 4, if a larger parallax level is provided, the amounts of change of the parallax level of the images GL, GR are −XL0 and XR0, respectively, in the x-axis direction in FIG. 4. In this case, the parallax level of the images GL, GR is increased by an amount of XL0+XR0, and thus the stereoscopic effect is increased.

Subsequently, the CPU 27 determines whether or not the parallax level has been changed to reach a control limit value (step ST3). The control limit value of the parallax level refers to a control value at which, for example, each of the images GL, GR is shifted to reach an opposite end of the other image. If the determination in step ST3 is negative, determination is made as to whether or not the user has released the hand from the manual operation button 3 to stop the instruction to control (step ST4). If the determination in step ST4 is negative, the process returns to step ST2. If the determination in step ST3 is affirmative, changing of the parallax level is stopped (step ST5), and a warning indicating that no further change can be made to the stereoscopic effect is displayed on the LCD 2 (step ST6), and the process proceeds to step ST4. In this manner, the three-dimensional processing and the stereoscopic display are continued with changing the parallax level to achieve the instructed stereoscopic effect until the parallax level reaches the control limit value or the user releases the hand from the manual operation button 3.

Figure 5:
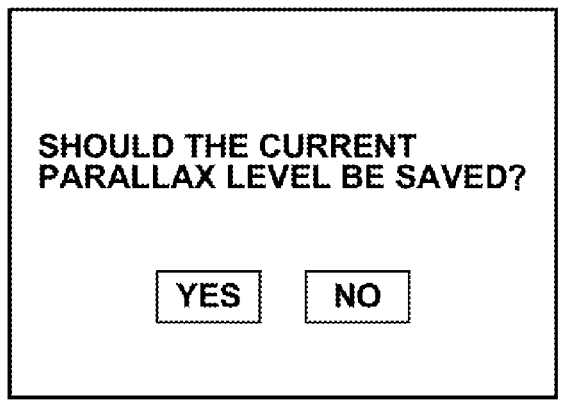
FIG. 5 is a diagram illustrating a query screen for determining whether or not a current parallax level should be saved.

If the determination in step ST4 is affirmative, the CPU 27 displays a query screen for determining whether or nor the current parallax level should be saved, as shown in FIG. 5, on the LCD 2 (step ST7). The user can select "YES" or "NO" via the manual operation button 3. If "NO" is selected, the process returns to step ST1. If "YES" is selected, the recording control unit 21 receives specification of a parallax level saving mode (step ST8). Specifically, specification of one of the following mode: a mode where, if the parallax level has previously been changed, only a difference between the current parallax level and the previously changed parallax level is saved, and a mode where, if the parallax level has not been changed, the current parallax level is overwritten is received. Then, the recording control unit 21 describes the current parallax level as the stereoscopic effect control values in the headers of the images GL, GR according to the specified mode (step ST9) and records the images GL, GR in the recording medium 4 (step ST10), and the process ends. The images GL, GR recorded in the recording medium 4 are overwritten with the images GL, GR having the stereoscopic effect control values described in the headers thereof.

Figure 6:
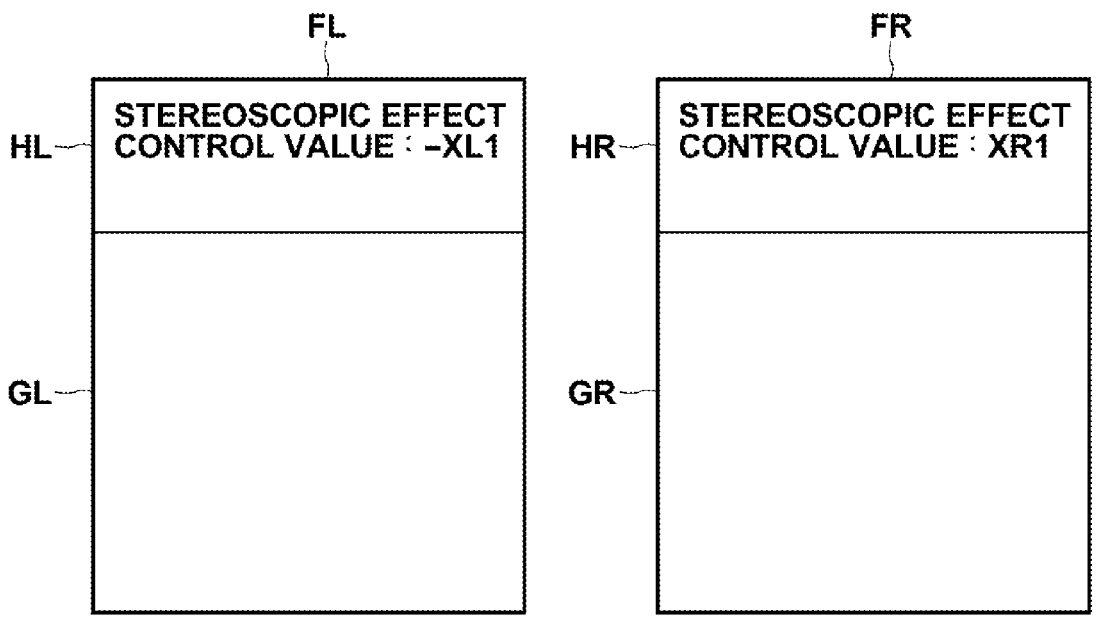
FIG. 6 is a diagram illustrating the file structure of image files having stereoscopic effect control values described in headers thereof.

FIG. 6 is a diagram illustrating the file structure of the image files of the images GL, GR having the stereoscopic effect control values described in the headers thereof. As shown in FIG. 6, the image files FL, FR of the images GL, GR include headers HL, HR and main images (denoted by the same symbols GL, GR as the images), which are substantial data of the images GL, GR. The headers HL, HR contain descriptions of the stereoscopic effect control values. For example, the header HL of the image GL contains a description "−XL1" as the stereoscopic effect control value, and the header HR of the image GR contains a description "XR1" as the stereoscopic effect control value.

Figure 7:
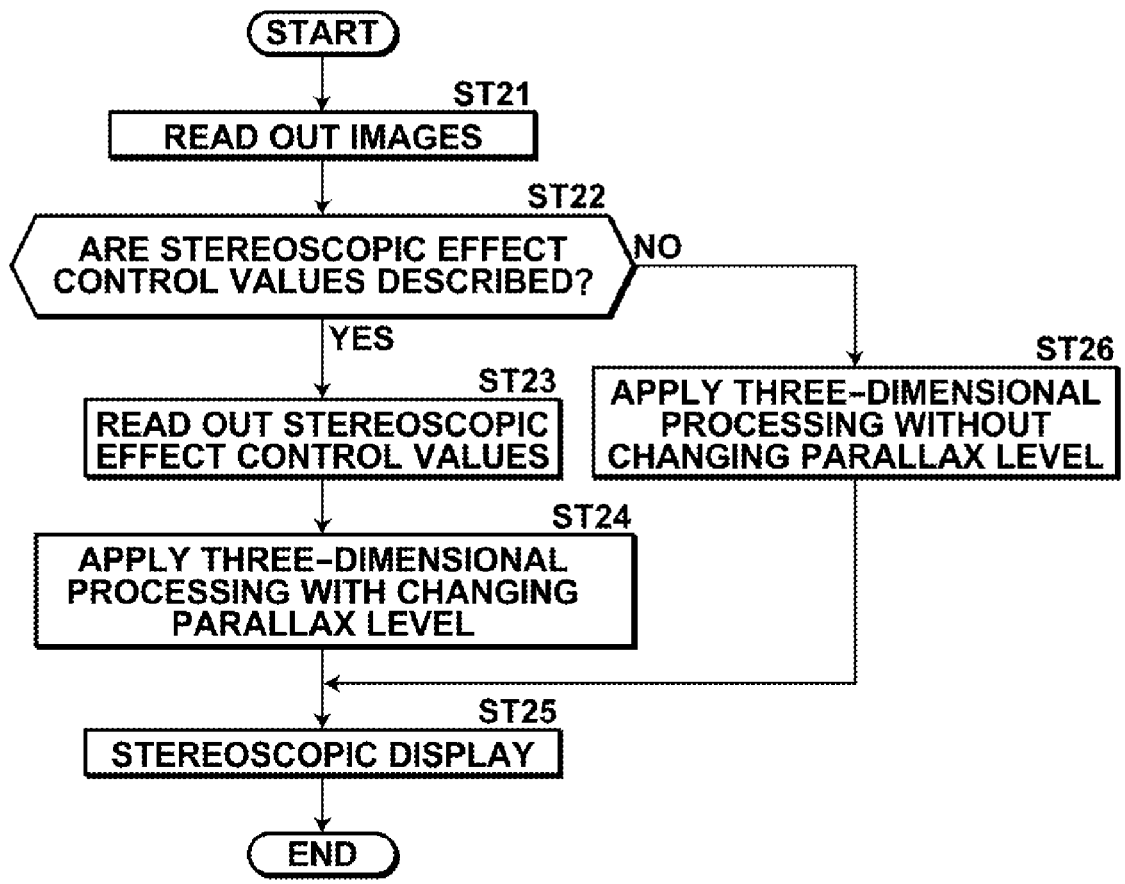
FIG. 7 is a flow chart illustrating a process that is carried out during stereoscopic display.

Next, a process carried out in the first embodiment when the images GL, GR recorded in the recording medium 4 are stereoscopically displayed is described. FIG. 7 is a flow chart illustrating a process that is carried out during the stereoscopic display. When an instruction to stereoscopically display the images is made via the manual operation button 3, the CPU 27 starts the process, and the recording control unit 21 reads out the images GL, GR to be displayed from the recording medium 4 and temporarily stores the images GL, GR in the frame memory 23 (step ST21). Then, the three-dimensional processing unit 25 determines whether or not the stereoscopic effect control values are described in the headers of the images GL, GR (step ST22). If the determination in step ST22 is affirmative, the stereoscopic effect control values described in the headers of the images GL, GR are read out (step ST23), and the three-dimensional processing is applied to the images GL, GR with changing the parallax level to achieve the parallax level based on the read out stereoscopic effect control values to generate the stereoscopic image G3 (step ST24). Then, the display control unit 26 stereoscopically displays the stereoscopic image G3 on the LCD 2 (step ST25), and the process ends.

On the other hand, if the determination in step ST22 is negative, the three-dimensional processing is applied to the images GL, GR without changing the parallax level to generate the stereoscopic image G3 (step ST26). Then, the process proceeds to step ST25 to stereoscopically display the stereoscopic image G3, and the process ends.

As described above, in this embodiment, the stereoscopic effect control values are described in the headers of the original images GL, GR before the three-dimensional processing is applied thereto and are recorded in the recording medium 4. Thus, if the user wants to change the stereoscopic effect at a later time, the three-dimensional processing is again applied to the original images GL, GR to change the stereoscopic effect.

Further, the stereoscopic effect control values are described in the headers HL, HR of the image files FL, FR of the images GL, GR. Therefore, by applying the three-dimensional processing to achieve the parallax level based on the stereoscopic effect control values described in the headers HL, HR, the images GL, GR can be stereoscopically displayed to have a stereoscopic effect according to the preference of the user who has controlled the stereoscopic effect. This eliminates the need of control of the stereoscopic effect by the user each time the stereoscopic display is carried out, thereby reducing the burden on the user.

Next, a second embodiment of the invention is described. An image display device according to the second embodiment has the same configuration as that of the image display device according to the first embodiment, and only the process carried out by the device is different. Therefore, detailed description of the configuration of the image display device of the second embodiment is omitted.

Figure 8:
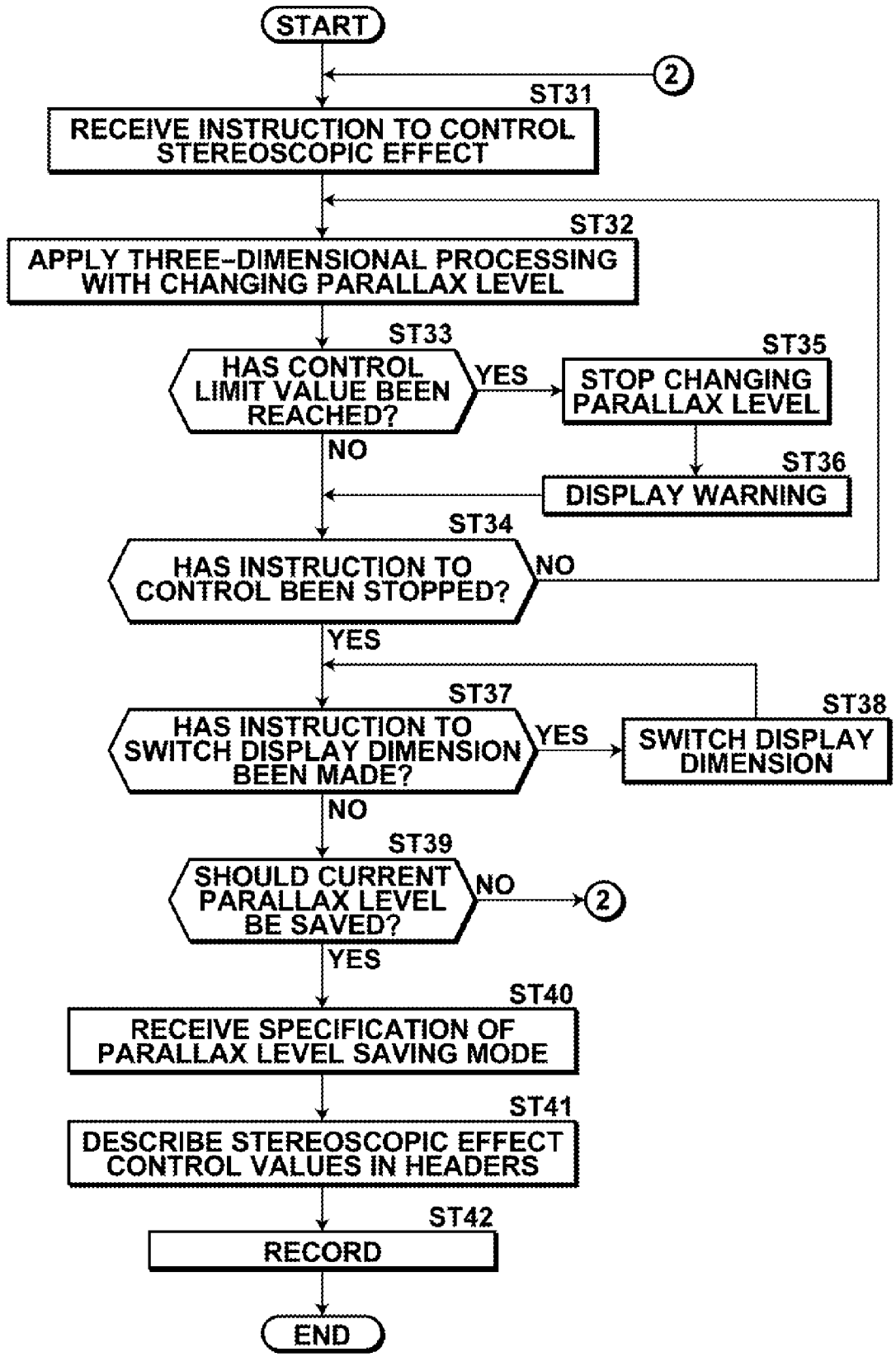
FIG. 8 is a flow chart illustrating a process that is carried out during stereoscopic effect control in a second embodiment.

FIG. 8 is a flow chart illustrating a process carried out in the second embodiment. In this description, it is assumed that the three-dimensional processing has been applied to the images GL, GR read out from recording medium 4 without changing the parallax level, and the thus generated stereoscopic image G3 is stereoscopically displayed on the LCD 2. The CPU 27 starts the process when the stereoscopic image G3 is stereoscopically displayed, and receives an instruction to control the stereoscopic effect made by the user via the manual operation button 3 (step ST31). With this, the three-dimensional processing unit 25 applies the three-dimensional processing to the images GL, GR with changing the parallax level to achieve the instructed stereoscopic effect (step ST32).

Subsequently, the CPU 27 determines whether or not the parallax level has been changed to reach a control limit value (step ST33). If the determination in step ST33 is negative, determination is made as to whether or not the user has released the hand from the manual operation button 3 to stop the instruction to control (step ST34). If the determination in step ST34 is negative, the process returns to step ST32. If the determination in step ST33 is affirmative, changing of the parallax level is stopped (step ST35), and a warning indicating that no further change can be made to the stereoscopic effect is displayed on the LCD 2 (step ST36), and the process proceeds to step ST34. In this manner, the three-dimensional processing and the stereoscopic display are continued with changing the parallax level to achieve the instructed stereoscopic effect until the parallax level reaches the control limit value or the user releases the hand from the manual operation button 3.

Figure 9:
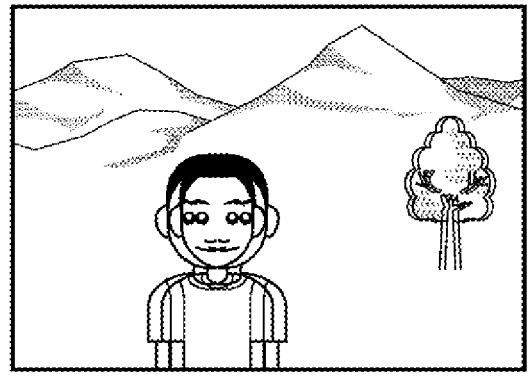
FIG. 9 is a diagram illustrating a state where two-dimensional display is achieved.

If the determination in step ST34 is affirmative, the CPU 27 determines whether or not an instruction to switch the display dimension has been made via the manual operation button 3 (step ST37). The instruction to switch the display dimension may be made, for example, via the center button 3C of the manual operation button 3. If the determination in step ST37 is affirmative, the display control unit 26 changes the display dimension of the image currently displayed on the LCD 2 (step ST38), and the process returns to step ST37. That is, if the stereoscopic image is displayed on the LCD 2, the overlapped images GL, GR are two-dimensionally displayed on the LCD 2 in a semi-transparent state, as shown in FIG. 9, in place of the stereoscopic image G3. On the other hand, if the two-dimensional image is displayed, the stereoscopic image G3 is stereoscopically displayed in place of the two-dimensional display of the overlapped images GL, GR.

If no instruction to switch the display dimension has been made within a predetermined time, a negative determination is made in step ST37, and the query screen for determining whether or nor the current parallax level should be saved is displayed on the LCD 2 (step ST39). The user can select "YES" or "NO" via the manual operation button 3. If "NO" is selected, the process returns to step ST31. If "YES" is selected, the recording control unit 21 receives specification of a parallax level saving mode (step ST40). Specifically, specification of one of the following modes: a mode where, if the parallax level has already been changed, only a difference between the current parallax level and the already changed parallax level is saved, and a mode where, if the parallax level has not been changed, the current parallax level is overwritten is received. Then, the recording control unit 21 describes the current parallax level as the stereoscopic effect control values in the headers of the images GL, GR according to the specified mode (step ST41) and records the images GL, GR in the recording medium 4 (step ST42), and the process ends.

As described above, in the second embodiment, display of the images GL, GR can be switched between the stereoscopic display and the two-dimensional display. The two-dimensional display allows the user to easily check how large the parallax level of the images GL, GR is.

Figure 10:
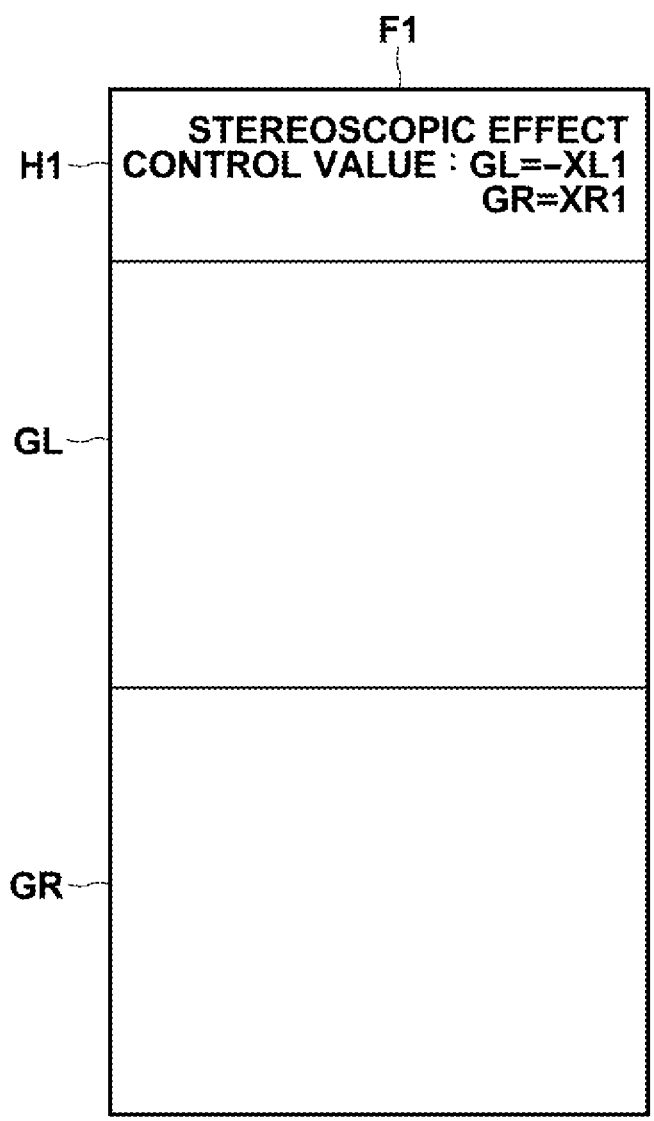
FIG. 10 is a diagram illustrating the file structure of an image file including two connected images.

Although the stereoscopic effect control values are described in the headers HL, HR of the image files FL, FR of the images GL, GR in the above-described first and second embodiments, in some cases, an image file F1 containing the connected images GL, GR, as shown in FIG. 10 may be formed. In this case, the stereoscopic effect control values of the images GL, GR may be described in a header H1 of the image file F1.

Figure 11:
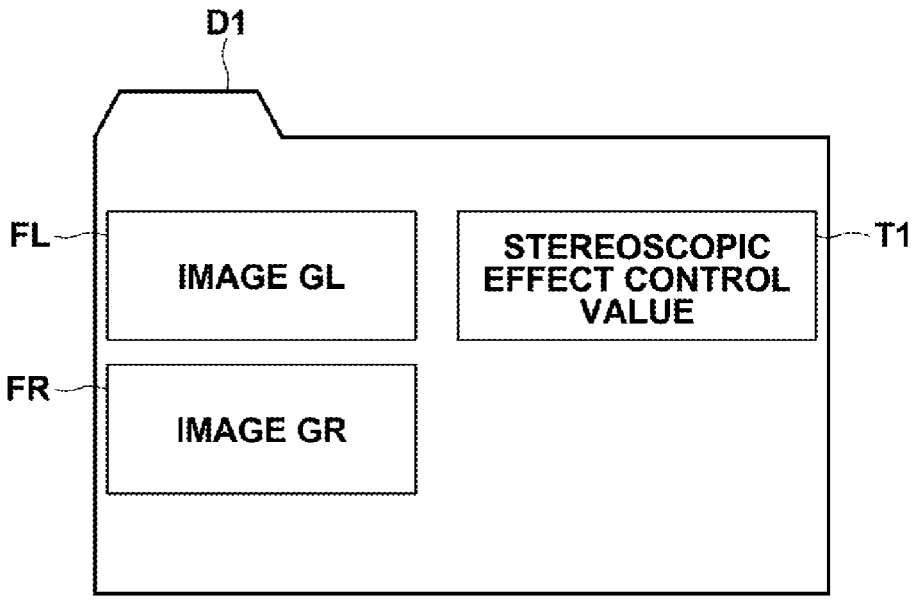
FIG. 11 is a diagram illustrating how the image files and a text file of the stereoscopic effect control values are stored.

The images GL, GR and the stereoscopic effect control values may be stored as separate files. For example, as shown in FIG. 11, the image files FL, FR of the images GL, GR and a text file T1 describing the stereoscopic effect control values may be stored in a folder D1. In this case, a copy of the image files FL, FR of the original images GL, GR may be stored in the same folder D1 together with the text file T1, or the original images GL, GR may be moved from the folder where they were stored to be stored in the same folder D1 as the text file T1.

Figure 12:
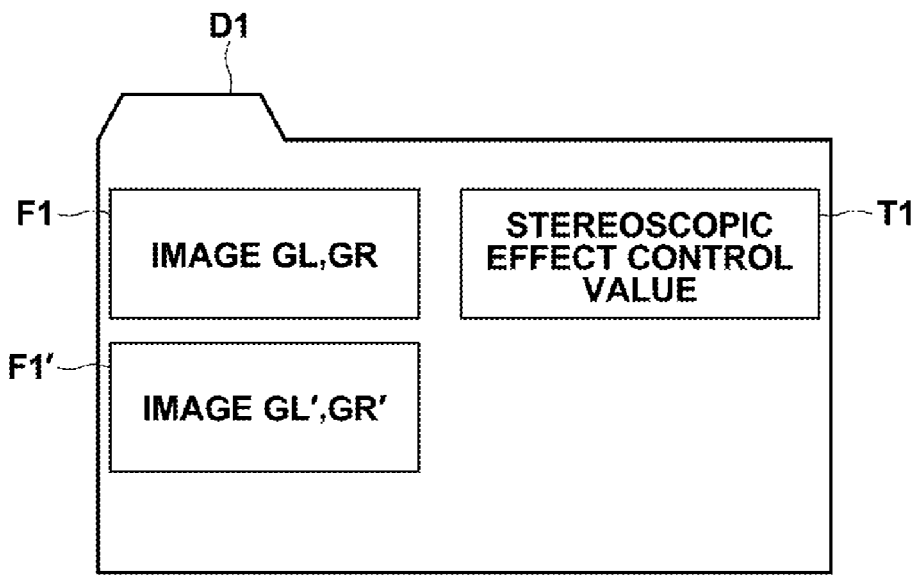
FIG. 12 is another diagram illustrating how the image files and the text file of the stereoscopic effect control values are stored.

In particular, in a case where the images GL, GR are stored as the single image file F1, as shown in FIG. 12, more than one image files F1, F1' and the text file T1 describing the stereoscopic effect control values may be stored in the same folder D1. In this case, the stereoscopic effect control values for all the images stored in the folder D1 are described in the text file T1 with being associated with the image files F1, F1'.

Figure 13:
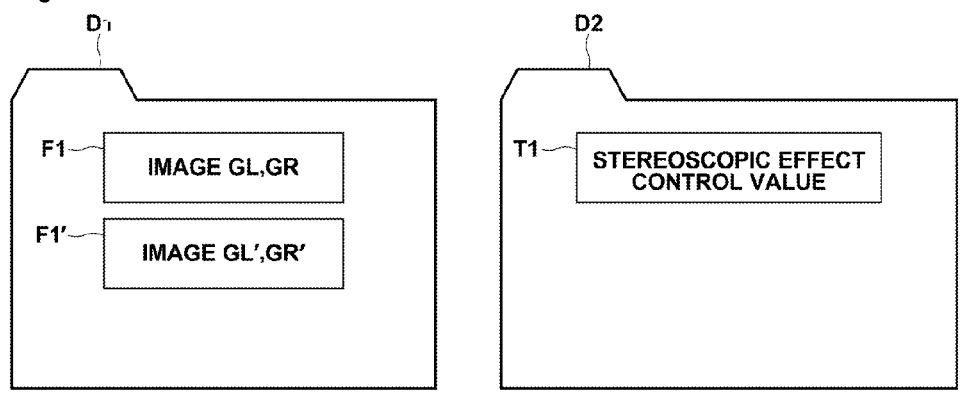
FIG. 13 is still another diagram illustrating how the image files and the text file of the stereoscopic effect control values are stored.

Further, as shown in FIG. 13, the folder D1 may store only the image files F1, F1', and a separate folder D2 may store a text file T0 describing the stereoscopic effect control values. In this case, the stereoscopic effect control values for all the images stored in the folder D1 are described in the text file T0 with being associated with the image files F1, F1'.

In addition, although the parallax level is used as the stereoscopic effect control values in the above-described first and second embodiments, the stereoscopic effect control values may be amounts of change to correct for inclination, scaling factor and distortion of the images, or may be amounts of correction to correct for white balance variation, brightness variation and color variation between the images. In this case, the user may select any of items, such as inclination, scaling factor, distortion, white balance, brightness and color of the images, as an item to be changed, and change the selected item via the manual operation button 3 to achieve the desired stereoscopic effect.

Figure 14:
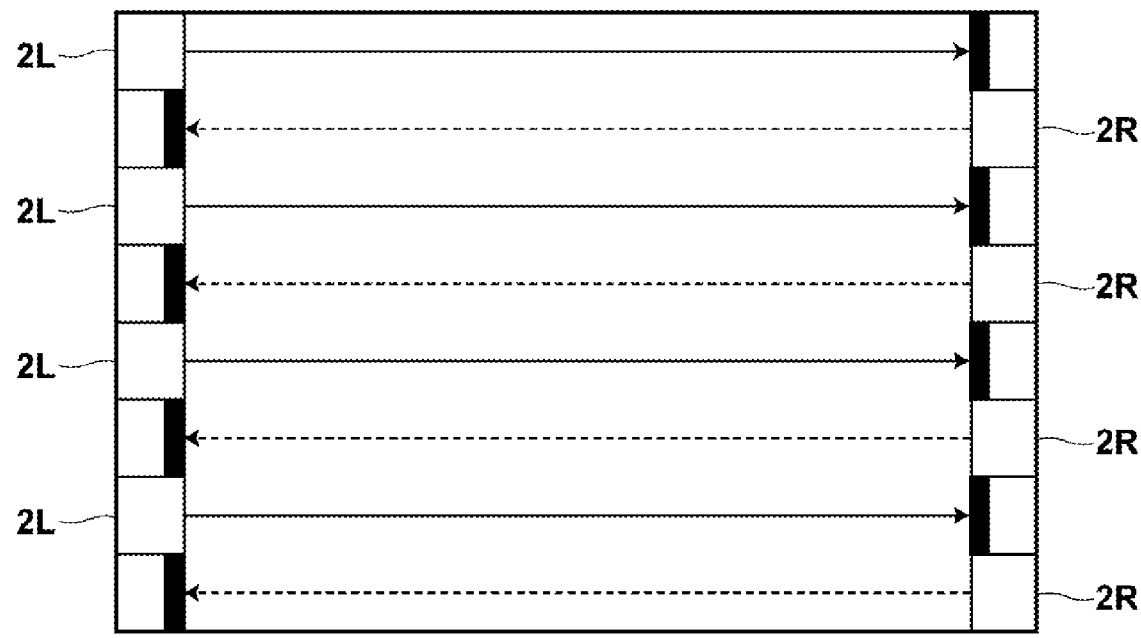
FIG. 14 is a diagram illustrating the structure of backlights of a LCD of a scanning backlight system.
Figure 15:
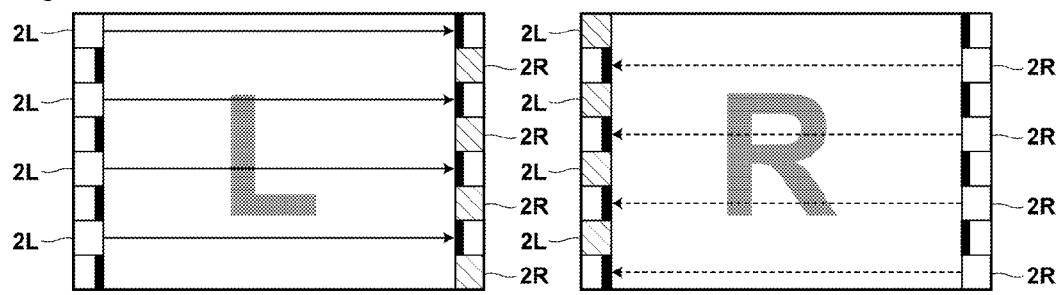
FIG. 15 is a diagram for explaining stereoscopic display with the scanning backlight system.

Although the two-dimensional display in the above-described second embodiment is achieved by displaying the overlapped images GL, GR, as shown in FIG. 9, the manner of the two-dimensional display of the images GL, GR varies depending on the stereoscopic display system used. For example, in a case where the stereoscopic display system is a scanning backlight system, the LCD 2 includes backlights 2L for the left eye and backlights 2R for the right eye, as shown in FIG. 14. In the following description, optical paths of the backlights 2L for the left eye are indicated by solid lines, and optical paths of the backlights 2R for the right eye are indicated by dashed lines. When the stereoscopic display is carried out, an operation to turn on the backlights 2L for the left eye and display the image GL for the left eye and an operation to turn on the backlights 2R for the right eye and display the image GR for the right eye, as shown in FIG. 15, are continuously switched at a high speed (for example, 60 Hz) to provide the stereoscopic effect using the afterimage effect (a three-dimensional mode). In FIG. 15, turned-off backlights are indicated with hatching. The displayed image GL or GR is represented by the symbol "L" or "R".

Figure 16:
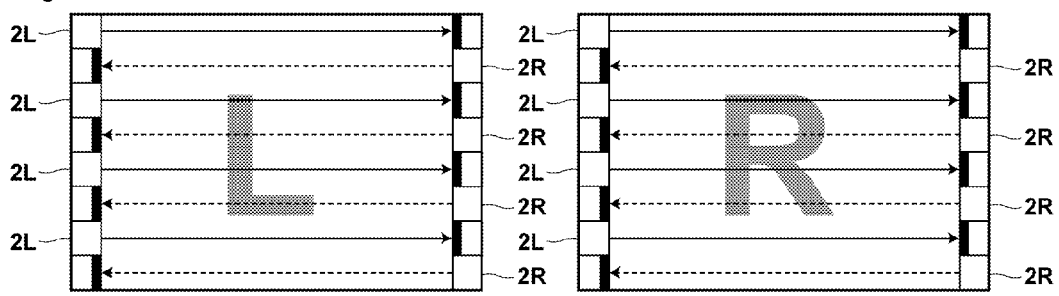
FIG. 16 is a diagram for explaining two-dimensional display with the scanning backlight system.

On the other hand, when the two-dimensional display is carried out, the backlights 2L and 2R for the left and right eyes are simultaneously turned on, as shown in FIG. 16, and display of the image GL for the left eye and display of the image GR for the right eye are continuously switched at a high speed to effect overlapped display of the two images GL, GR, as shown in FIG. 9 (a two-dimensional mode).

In a case where the stereoscopic display system is a system other than the scanning backlight system, such as a lenticular system or a parallax barrier system, the stereoscopic display is achieved by displaying the stereoscopic image G3 which is generated by applying the three-dimensional processing to the images GL, GR. The two-dimensional display, however, is achieved by displaying the images GL, GR overlapped each other in a semi-transparent state without applying the three-dimensional processing, so that the two images GL, GR appear as being overlapped, as shown in FIG. 9.

In a case where the stereoscopic display system according to this embodiment is an anaglyph system or a polarization filter system, the images GL, GR appear as being overlapped when the user takes the eye glasses off. Therefore, the two-dimensional display is achieved without changing the manner of display of the images GL, GR.

When the stereoscopic display is carried out, a narrower overlapping area is provided between the images GL, GR with a larger parallax level of the images GL, GR, resulting in a narrower display range for the stereoscopic display. That is, as shown in FIG. 17, when the parallax level of the images GL, GR is small, the display range of the overlapped images GL, GR is as indicated by an area A1 shown in FIG. 17, and when the parallax level is larger, the display range of the overlapped images GL, GR is smaller than that when the parallax level is small, as indicated by an area A2. It should be noted that the images GL, GR and the areas A1, A2 have the same aspect ratio.

The stereoscopic display is carried out using the overlapping range between the images GL, GR. Therefore, the larger the parallax level, the smaller the area trimmed out from the images GL, GR for the stereoscopic display. As a result, the stereoscopic image G3 stereoscopically displayed on the LCD 2 is enlarged. In this embodiment, when the parallax level is changed, the stereoscopically displayed stereoscopic image G3 may be enlarged or reduced to change the size thereof depending on the parallax level. However, in this case, the change of the display size of the image may catch the user's eyes and may hinder the user from determining an appropriate parallax level.

Therefore, for example, a black frame, as shown in FIG. 18, may be added around the stereoscopically displayed stereoscopic image depending on the amount of change of the parallax level to provide indication of an actual display range on the LCD 2 during the stereoscopic display, i.e., the range of the images GL, GR to be trimmed out. With this, the user can concentrate on control of the stereoscopic effect, and thus can efficiently control the stereoscopic effect.

It should be noted that the frame may also be added during the two-dimensional display in the second embodiment in the similar manner as during the stereoscopic display.

If the parallax level is excessively large, appropriate stereoscopic viewing cannot be provided. Therefore, when the parallax level is too large to provide the stereoscopic viewing, the color of the frame may be changed to notify the user to that effect. In this case, the color of the frame may be changed stepwise according to the magnitude of the parallax level, such as to blue, to yellow and to red as the parallax level increases.

Further, in the above-described first and second embodiments, when the parallax level is changed, an area with the parallax level of 0 appears on the images GL, GR. In this case, the color of the area with the parallax level of 0 in the stereoscopic image G3 may be changed so that the user can tell the area with the parallax level of 0. For example, in the stereoscopic image shown in FIG. 19, if the parallax level is 0 at the person's face, the color of the person's face may be changed to a predetermined color (red, for example). In FIG. 19, the color change is indicated by hatching. With this, the user can easily recognize the area with the parallax level of 0. Similarly, during the two-dimensional display, the color of the area with the parallax level of 0 in the overlapped images GL, GR may be changed.

If there is an area with the parallax level of 0, the user may be notified of the fact with a sound.

It should be noted that, although the images are read out from the recording medium 4 to be fed to the image display device 1 in the above-described first and second embodiments, this is not intended to limit the invention. The images may be fed from an image server connected to the image display device 1 via a network, or the images may be fed via non-contact communication.

Further, the image display device 1 according to the first and second embodiments may be applied to a binocular (polynocular) photographing device including two or more imaging units. In this case, two or more images obtained through photographing can immediately be displayed on the monitor to allow control of the stereoscopic effect before the images are recorded in the recording medium 4.

In addition, although the instructions to control the stereoscopic effect are received via the manual operation button 3 operated by the user in the above-described first and second embodiments, the form of the user interface is not limited to one described in the above embodiments. For example, the instructions from the user may be received through the use of a remote controller, or a button for receiving the instructions from the user may be displayed on a display including a touch panel.

The device 10 according to the embodiments of the invention has been described. In addition, the invention may be implemented as a program for causing a computer to function as means corresponding to the three-dimensional processing unit 25, the recording control unit 21 and the display control unit 26 to carry out the processes as shown in FIGS. 3, 7 and 8. The invention may also be implemented as a computer-readable recording medium containing such a program.

The invention claimed is:

1. An image display device comprising:
   a display unit capable of stereoscopically displaying a stereoscopic image generated from more than one images taken from different points of view;
   an input unit for receiving an instruction to control a stereoscopic effect of the stereoscopic image while the stereoscopic image is stereoscopically displayed by the display unit;
   a three-dimensional processing unit for applying three-dimensional processing for stereoscopic display to the more than one images to generate the stereoscopic image, the three-dimensional processing being applied to achieve a stereoscopic effect according to the instruction; and
   a recording control unit for recording, in a recording unit, control values of the stereoscopic effect according to the instruction, the control values being associated with the more than one images, wherein, if there are the control values of the stereoscopic effect recorded in the recording unit, the recording control unit records, in the recording unit, difference values between the control values of the stereoscopic effect according to the instruction and the recorded control values of the stereoscopic effect,
   wherein, according to the instruction to control the stereoscopic effect, the display unit trims an area proportional to an aspect ratio identical to that of each of the more than one images from an overlapping range between the more than one images in the stereoscopic image, and displays the stereoscopic image with adding a frame indicating the trimmed area around the stereoscopic image with respect to the trimmed area,
   wherein, in a case where the control values of the stereoscopic effect comprises a parallax level between the more than one images, the display unit changes a color of the frame stepwise depending on the parallax level.

2. The image display device as claimed in claim 1, wherein the input unit comprises a unit for receiving an instruction to switch between stereoscopic display of the stereoscopic image and two-dimensional display of the more than one images being overlapped each other, and the image display device further comprises a display control unit for switching between the stereoscopic display and the two-dimensional display according to the instruction to switch.

3. The image display device as claimed in claim 1, wherein the input unit comprises a unit for receiving an instruction to stereoscopically display the more than one images taken from different points of view recorded in the recording unit, the recording control unit comprises a unit to read out, from the recording unit, control values of the stereoscopic effect together with the more than one images when the instruction to stereoscopically display the more than one images recorded in the recording unit is made and when the more than one images have the control values of the stereoscopic effect associated therewith, and the three-dimensional processing unit comprises a unit for applying the three-dimensional processing to the more than one images based on the control values of the stereoscopic effect.

4. An image display method comprising:

applying three-dimensional processing to more than one images taken from different points of view to generate a stereoscopic image;

stereoscopically displaying the stereoscopic image;

receiving an instruction to control a stereoscopic effect of the stereoscopically displayed stereoscopic image;

applying the three-dimensional processing to the more than one images to achieve a stereoscopic effect according to the instruction; and recording, in a recording unit, control values of the stereoscopic effect according to the instruction, the control values being associated with the more than one images, wherein, if there are the control values of the stereoscopic effect recorded in the recording unit, difference values between the control values of the stereoscopic effect according to the instruction and the recorded control values of the stereoscopic effect are recorded in the recording unit, wherein, according to the instruction to control the stereoscopic effect, said step of applying three-dimensional processing trims an area proportional to an aspect ratio identical to that of each of the more than one images from an overlapping range between the more than one images in the stereoscopic image, and displays the stereoscopic image with adding a frame indicating the trimmed area around the stereoscopic image with respect to the trimmed area, wherein, in a case where the control values of the stereoscopic effect comprises a parallax level between the more than one images, a color of the frame is changed stepwise depending on the parallax level.

5. A non-transitory computer-readable recording medium containing a program for causing a computer to carry out an image display method, the method comprising:

applying three-dimensional processing to more than one images taken from different points of view to generate a stereoscopic image;

stereoscopically displaying the stereoscopic image;

receiving an instruction to control a stereoscopic effect of the stereoscopically displayed stereoscopic image;

applying the three-dimensional processing to the more than one images to achieve a stereoscopic effect according to the instruction; and recording, in a recording unit, control values of the stereoscopic effect according to the instruction, the control values being associated with the more than one images, wherein, if there are the control values of the stereoscopic effect recorded in the recording unit, difference values between the control values of the stereoscopic effect according to the instruction and the recorded control values of the stereoscopic effect are recorded in the recording unit, wherein, according to the instruction to control the stereoscopic effect, the step of applying three-dimensional processing trims an area proportional to an aspect ratio identical to that of each of the more than one images from an overlapping range between the more than one images in the stereoscopic image, and displays the stereoscopic image with adding a frame indicating the trimmed area around the stereoscopic image with respect to the trimmed area, and wherein, in a case where the control values of the stereoscopic effect comprises a parallax level between the more than one images, a color of the frame is changed stepwise depending on the parallax level.

6. An image display device comprising:

a display capable of stereoscopically displaying a stereoscopic image generated from more than one images taken from different points of view;

a user interface to receive an instruction to control a stereoscopic effect of the stereoscopic image while the stereoscopic image is stereoscopically displayed by the display;

a processor which at least applies three-dimensional processing for stereoscopic display to the more than one images to generate the stereoscopic image, the three-dimensional processing being applied to achieve a stereoscopic effect according to the instruction; and a recording control unit for recording, in a recording unit, control values of the stereoscopic effect according to the instruction, the control values being associated with the more than one images, wherein, if there are the control values of the stereoscopic effect recorded in the recording unit, the recording control unit records, in the recording unit, difference values between the control values of the stereoscopic effect according to the instruction and the recorded control values of the stereoscopic effect, wherein, according to the instruction to control the stereoscopic effect, the display trims an area proportional to an aspect ratio identical to that of each of the more than one images from an overlapping range between the more than one images in the stereoscopic image, and displays the stereoscopic image with adding a frame indicating the trimmed area around the stereoscopic image with respect to the trimmed area, wherein, in a case where the control values of the stereoscopic effect comprises a parallax level between the more than one images, the display unit changes a color of the frame stepwise depending on the parallax level.

7. The image display device as claimed in claim 6, wherein the user interface receives an instruction to switch between stereoscopic display of the stereoscopic image and two-dimensional display of the more than one images taken from different points of view being overlapped each other, and the image display device further comprises a display control unit for switching between the stereoscopic display and the two-dimensional display according to the instruction to switch.

8. The image display device as claimed in claim 6, wherein the user interface receives an instruction to stereoscopically display the more than one images recorded in the recording unit, the recording control unit comprises a unit to read out, from the recording unit, control values of the stereoscopic effect together with the more than one images when the instruction to stereoscopically display the more than one images recorded in the recording unit is made and when the more than one images have the control values of the stereoscopic effect associated therewith, and the processor applies the three-dimensional processing to the more than one images based on the control values of the stereoscopic effect.

9. The image display device as claimed in claim 1, wherein the recording control unit records, in the recording unit, the control values of the stereoscopic effect according to the instruction and the more than one images as separate files.

10. The image display device as claimed in claim 1, wherein, in the recording unit, the more than one images corresponding to two or more stereoscopic images are stored in a single folder, and a file describing the control values of the stereoscopic effect according to the instruction with respect to all the two or more stereoscopic images is stored in the single folder.

11. The image display device as claimed in claim 1, wherein, in the recording unit, the more than one images corresponding to two or more stereoscopic images are stored in a first folder, and a file describing the control values of the stereoscopic effect according to the instruction with respect to all the two or more stereoscopic images is stored in a second folder.

12. The image display device as claimed in claim 1, wherein the display unit displays, in place of the stereoscopic image, the more than one images in a semi-transparent state being overlapped each other.

13. The image display device as claimed in claim 1, wherein, when the input unit has received the instruction to control the stereoscopic effect, the three-dimensional processing unit changes the control values of the stereoscopic effect to achieve a stereoscopic effect according to the instruction, and the display unit displays the more than one images in a semi-transparent state being overlapped each other with the changed control values of the stereoscopic effect.

14. The image display device as claimed in claim 2, wherein, when the input unit has received an instruction to switch into the two-dimensional display of the more than one images being overlapped each other, the display unit carries out the two-dimensional display of the more than one images in a semi-transparent state being overlapped each other.

15. The image display device as claimed in claim 1, wherein the display unit displays the stereoscopic image with adding the frame around the stereoscopic image with respect to the trimmed area so as not to change a size of the stereoscopic image being displayed.

16. The image display device as claimed in claim 1, wherein, in a case where the control values of the stereoscopic effect comprises a parallax level between the more than one images, the display unit changes a color of an area where the parallax level is 0 in the stereoscopic image.

17. A polynocular imaging system comprising:
more than one imaging units for taking the more than one images from different points of view; and
the image display device as claimed in claim 1.

18. The image display device as claimed in claim 1, wherein, in a case where the control values of the stereoscopic effect comprises a parallax level between the more than one images, the display unit changes a color of the frame if the parallax level is inappropriate.

* * * * *